Figure 1:
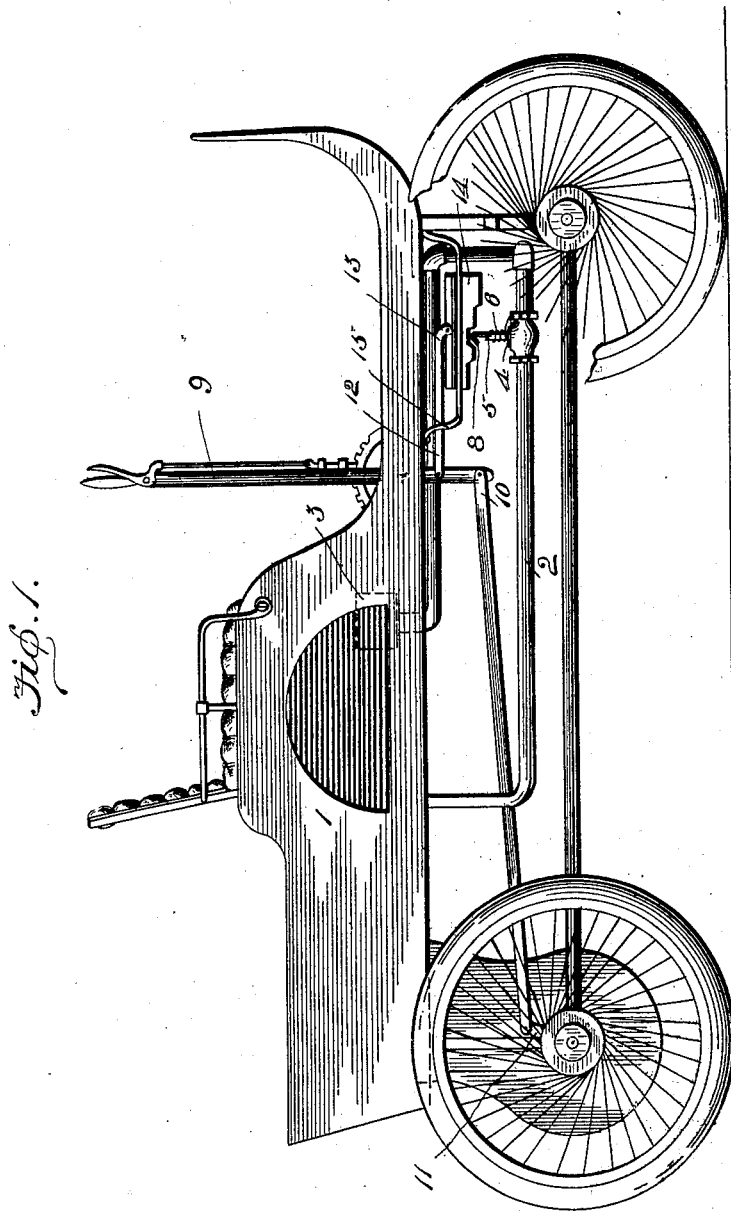

No. 694,065. Patented Feb. 25, 1902.
J. G. MacPHERSON.
CONTROLLER MECHANISM FOR AUTOMOBILES.
(Application filed June 11, 1901.)
(No Model.) 2 Sheets—Sheet 1.

No. 694,065. Patented Feb. 25, 1902.
J. G. MacPHERSON.
CONTROLLER MECHANISM FOR AUTOMOBILES.
(Application filed June 11, 1901.)
(No Model.) 2 Sheets—Sheet 2.
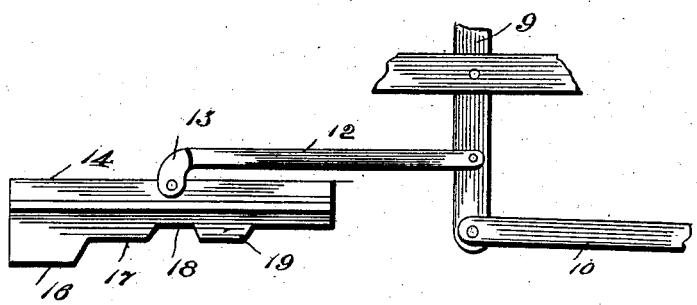
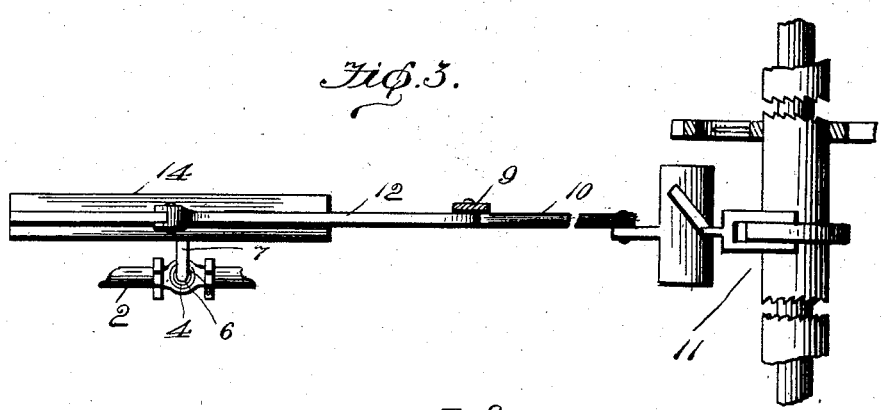
Witnesses
Bernard M. Offutt
John G. MacPherson, Inventor
by David T. Moore, Attorney

UNITED STATES PATENT OFFICE.

JOHN G. MacPHERSON, OF PHILADELPHIA, PENNSYLVANIA, ASSIGNOR TO THE MacPHERSON AUTOMOBILE COMPANY, OF PHILADELPHIA, PENNSYLVANIA.

CONTROLLER MECHANISM FOR AUTOMOBILES.

SPECIFICATION forming part of Letters Patent No. 694,065, dated February 25, 1902.

Application filed June 11, 1901. Serial No. 64,133. (No model.)

*To all whom it may concern:*

Be it known that I, JOHN G. MACPHERSON, a citizen of the United States, residing at Philadelphia, in the county of Philadelphia and State of Pennsylvania, have invented certain new and useful Improvements in Hydrocarbon-Automobile Controller Mechanisms, of which the following is a specification.

This invention relates to improvements in hydrocarbon-automobile controller mechanism; and the object of my invention is to produce a mechanism of simple construction which will control the speed of the automobile, as well as start and reverse the propulsion of the same.

With this object in view I provide a device which regulates the speed and movement of the automobile by operating upon the supply of hydrocarbon or gas mixture, said device being readily accessible to a person sitting in the vehicle.

To attain the desired object, my invention consists of a controller mechanism for hydrocarbon-automobiles embodying novel features of construction and combination of parts, substantially as disclosed herein.

In the drawings, Figure 1 is a side elevation of a portion of an automobile with my invention applied thereto. Fig. 2 is an enlarged detail view of the controller from the opposite side with its connections, and Fig. 3 is a top plan view thereof. Fig. 4 is an elevation of the valve removed. Fig. 5 is a top plan view of the clutch.

Referring to the drawings, 1 designates the cylinder of a hydrocarbon-engine, and 2 the supply-pipe leading therefrom and connected with the vaporizer 3, these being of well-known construction. Located in the supply-pipe between the cylinder and the vaporizer is a cock or valve 4, which is adapted to control communication between the vaporizer and cylinder. Surrounding this valve-stem 5 is a spring 6, which is so connected thereto and the pipe as to normally hold the valve closed when the automobile or wagon is not moving. Carried by the valve and extending normally at about right angles to the pipes is a crank or lever 7, having an angle-arm 8 on its outer ends. Pivoted to the floor of the automobile is a lever 9, which is provided with the usual dog-and-ratchet connection for holding the same at the proper position. Connected to the lever's lower end is a rod 10, which operates a clutch-controller 11 of a transmission-gear to throw in or out the clutches for giving the automobile a forward or backward movement. Pivotally connected to the lever intermediate of the lower end and its fulcrum is a rod 12, which extends in an opposite direction to the other lever and is toward the front of the automobile. This lever has a grooved outer end 13, which is pivoted to the upper central part of the cam-shaped slide 14, which is slidably mounted in the frame 15. Upon the lower surface of this slide is provided the high-speed bearing-surface 16, the normal-speed bearing-surface 17, the central notch 18, which is engaged when the valve is closed, and the rear bearing-surface 19 for reversing the motion of the automobile.

The angle-arm 8 of the valve is adapted to always contact the under side of the sliding plate and normally rests in the central notch 18, and when in this position the valve is closed. When it is desired to give the automobile a forward motion at medium speed, the lever is pulled backward until the surface 17 contacts the angle-arm, causing the valve to be slightly open; but should a higher speed be desired the lever is pulled farther backward until the surface 16 contacts the angle-arm, thus opening the valve to its fullest extent and allowing a full charge of hydrocarbon or gas mixture to be admitted to the explosion-chamber of the engine. Should it be desirable to reverse the automobile, it is simply necessary to push the lever forward, causing the angle-arm to be engaged by the surface 19, which turns the valve in the opposite direction, and at the same time the clutch mechanism is operated to reverse the movement of the shaft.

From this description it is evident that I provide a controller mechanism which is the embodiment of simplicity, durability, and cheapness and one which is easily and quickly operated by the single clutch-cam to regulate the flow of the hydrocarbon-gas mixture, and consequently the speed, and by the movement of the clutch mechanism the automobile is either started or reversed. This controller can be attached to any hydrocarbon-engine for automobiles, and by means of the operating-lever the proper motion is imparted to the transmission-gear, while at the same time the speed of the engine is regulated by this improved controlling mechanism.

What I claim as new, and desire to secure by Letters Patent, is—

1. In a controller for automobiles, the combination of a hand-operated lever, a rod pivoted to said lever, a slide-cam carried by said rod, a spring-actuated valve mounted in the supply-pipe of the engine, an arm carried by the valve and contacted by the slide, and another rod connected to the lever's end to control the movement of the automobile.

2. In an automobile controlling mechanism a lever, a rod pivoted to the lower end thereof, a clutch mechanism connected to the propelling portion of an automobile and operated by said rod, another rod connected to said lever and extending in opposite directions therefrom, and a cam-slide operated by said last-mentioned rod, and a spring-actuated valve in the supply-pipe of an engine having an angle-arm operated by said cam-slide to regulate the flow of hydrocarbon gases to the engine.

3. In an automobile controlling mechanism a lever, means for controlling the transmission of power to the automobile, a rod connected to the lever, a cam-slide carried by said rod and provided with a central notch, a medium-speed-regulating surface, a high-speed-regulating surface, and a reverse-speed-regulating surface upon the under side thereof, a spring-actuated valve in the supply-pipe of an engine, and an angle-arm carried by the valve and operated upon to open and close the valve by means of the surfaces of the cam-slide.

In testimony whereof I affix my signature in presence of two witnesses.

JOHN G. MACPHERSON.

Witnesses:
ANTHONY GROSS,
CHAS. W. TOMLINSON.